(12) United States Patent
Aoki

(10) Patent No.: US 6,377,756 B1
(45) Date of Patent: Apr. 23, 2002

(54) OPERATION BUTTON USED FOR PORTABLE APPARATUS

(75) Inventor: Nobuhiro Aoki, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 27 days.

(21) Appl. No.: 09/585,271

(22) Filed: Jun. 2, 2000

(30) Foreign Application Priority Data

Jun. 2, 1999 (JP) .......................................... 11-155738

(51) Int. Cl.[7] .............................................. G03B 17/00
(52) U.S. Cl. ...................................................... 396/543
(58) Field of Search ........................................ 396/543

(56) References Cited

U.S. PATENT DOCUMENTS 5,815,760 A * 9/1998 Ito et al. ..................... 396/543

FOREIGN PATENT DOCUMENTS

JP           10-090768           4/1998

* cited by examiner

*Primary Examiner*—David M. Gray
*Assistant Examiner*—Rochelle Blackman
(74) *Attorney, Agent, or Firm*—Young & Thompson

(57) ABSTRACT

An operation button comprises a button body swingably attached to a recess of a portable apparatus. The button body has a conical shape and is uniformly urged toward the recess by arm portions of a leaf spring. The button body is kept in a neutral position where a bottom edge of the button body abuts on the bottom of the recess and the button body does not incline. When the operation button is depressed, the button body is swung in a state that the bottom edge thereof is a fulcrum. Upon this, contact points formed on a printed circuit board is short-circuited. The arm portion corresponding to the depressed position urges a button cover in a direction separating from the recess. At the same time, a position of the button body opposite to the depressed position is urged toward the recess by the other arm portion. When the operation button is stopped to be depressed, it is speedily returned to the neutral position owing to synergism of the arm portions.

13 Claims, 4 Drawing Sheets

OPERATION BUTTON USED FOR PORTABLE APPARATUS

BACKGROUND OF THE INVENTION

1. Field of the Invention

The present invention relates to an operation button used for portable apparatus of a camera and so forth. Particularly, the present invention relates to an operation button having a thin thickness.

2. Description of the Related Art

In recent years, portable apparatus of a camera and so forth have been contrived such that various functions can be operated in a limited space. As to one of such contraptions regarding a camera, it is known that an electric zooming operation and a mode setting operation can be performed by a single operation button. This is disclosed in Japanese Patent Laid-Open Publication No. 10-90768 (counterpart of U.S. Pat. No. 5,815,760).

An operation button described in the above publication is schematically shown in FIGS. 4A and 4B. A main part of the operation button 50 is constituted of a button body 51 having a disc shape. A central portion of the button body 51 is formed with a through hole 52 into which a boss 53a is inserted. The boss 53a projects from an inner frame 53 of a camera body. The button body 51 is fixed to the boss 53a by a screw-like retainer 55 so as not to trip. Moreover, the button body 51 is urged by a leaf spring 56 in a direction separating from the inner frame 53. Meanwhile, a button cover 57 for obscuring the retainer 55 is attached to a surface of the button body 51. The operation button 50 is provided with a plurality of depressed positions which are arranged in a circumferential direction of the operation button 50. Under the respective depressed positions, is disposed a switch 58 for detecting the depression of the operation button 50.

As shown in FIG. 4B, when one of the depressed positions of the operation button 50 is depressed by a finger, the button body 51 is swung around a position where an lower face of a flange 55a of the retainer 55 comes into contact with an upper face of the button body 51 which is opposite to the depressed position relative to the retainer 55. Owing to this, a protrusion 51a depresses the switch 58 to turn on it. When the finger depressing the operation button 50 is released, the switch 58 is turned off. At the same time, the button body 51 is pushed up by the leaf spring 56 and is returned to the original state.

The above operation button 50 has the depressed positions arranged in the circumferential direction thereof. Thus, the operation button 50 needs to have a space a secured along the round of the boss 53a in order to swing the button body 51. Hence, the operation button 50 is kept in a floating state that the whole of the operating button 50 is separated from the camera body by the leaf spring 56. Accordingly, there arises a problem in that the operation button 50 as a whole has a thick depth.

SUMMARY OF THE INVENTION

In view of the foregoing, it is a primary object of the present invention to provide an operation button of which thickness is adapted to be thin.

It is a second object of the present invention to provide an operation button in which it is possible to employ a thin urging member having urging force being relatively weak.

In order to achieve the above and other objects, the operation button according to the present invention comprises a button body and an urging member. The button body is swingably attached to an exterior wall of a portable apparatus, and has a plurality of depressed positions which are arranged in a circumferential direction of the operation button. The urging member urges the button body in a direction from the outside of the portable apparatus to the inside thereof. In virtue of this, return force for returning the button body to a neutral position is applied to the button body by the urging member. In the neutral position, the button body is kept so as not to incline.

Meanwhile, the button body is provided with a button cover for veiling the urging member so as to contain the urging member between the button body and the button cover. When one of the depressed positions of the button body is pressed, the button body is swung in a state that the bottom of the button body is a fulcrum. At this time, the urging member corresponding to the depressed position urges the button cover toward the outside of the portable apparatus. At the same time, a position of the button body opposite to the depressed position is urged toward the inside of the portable apparatus by the urging member. When the button body is stopped to be depressed, it is speedily returned to the neutral position due to synergism of two portions of the urging member.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 2:
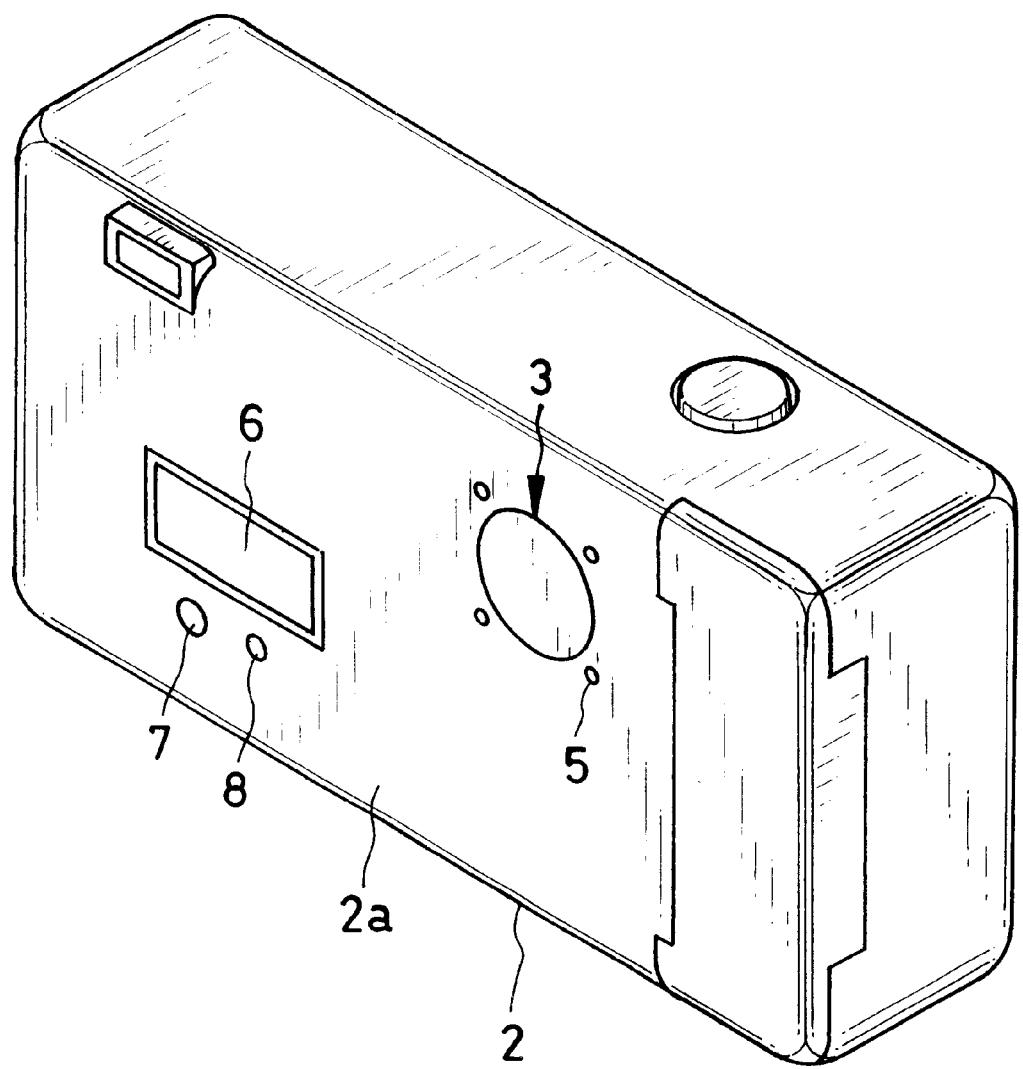
FIG. 2 is a perspective view showing a camera to which the operation button is attached.

A camera as a portable apparatus is shown in FIG. 2. This drawing shows a rear perspective view of the camera. In FIG. 2, a camera body 2 has a rear face 2a provided with an operation button 3 according to the present invention. The operation button 3 is disposed at a position where it is easily operated by a thumb of a right hand. Around the operation button 3, four LEDs 5 are arranged at regular intervals in a circumferential direction. The LEDs represent four depressed positions of the operation button 3. When various modes are set, the LED 5 is turned on or is blinked or is turned off as the occasion demands to call operator's attention. Further, the LED 5 indicates whether an operation is effectual or not. A left side of the rear face 2a is provided with a function changing button 7 and a date setting button 8 which are disposed under a liquid crystal panel 6. The button 7 is for changing a function of the operation button 3 at the time of setting the various modes. The button 8 is used for setting a photographic date.

Figure 1A:
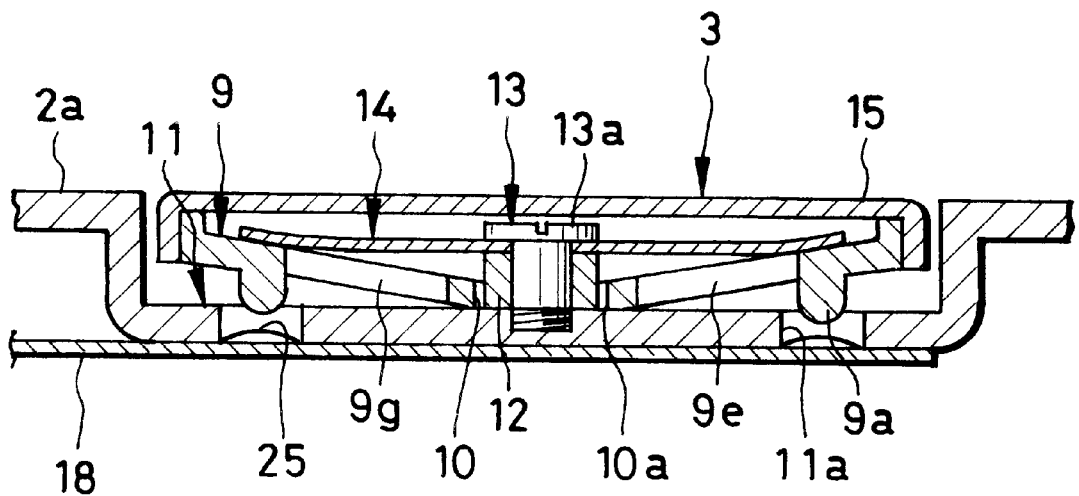
FIGS. 1A and 1B are sectional views showing structure of an operation button according to the present invention.
Figure 1B:
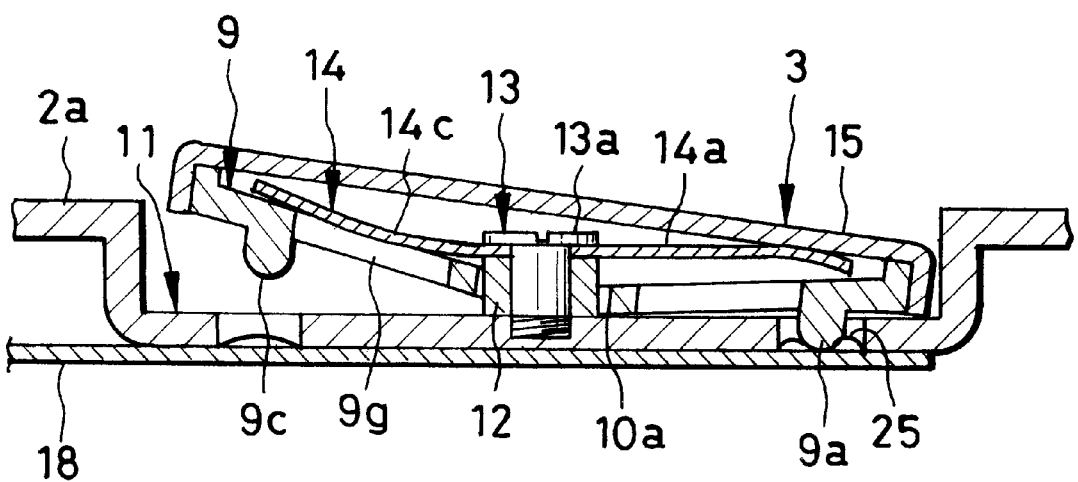
Figure 3:
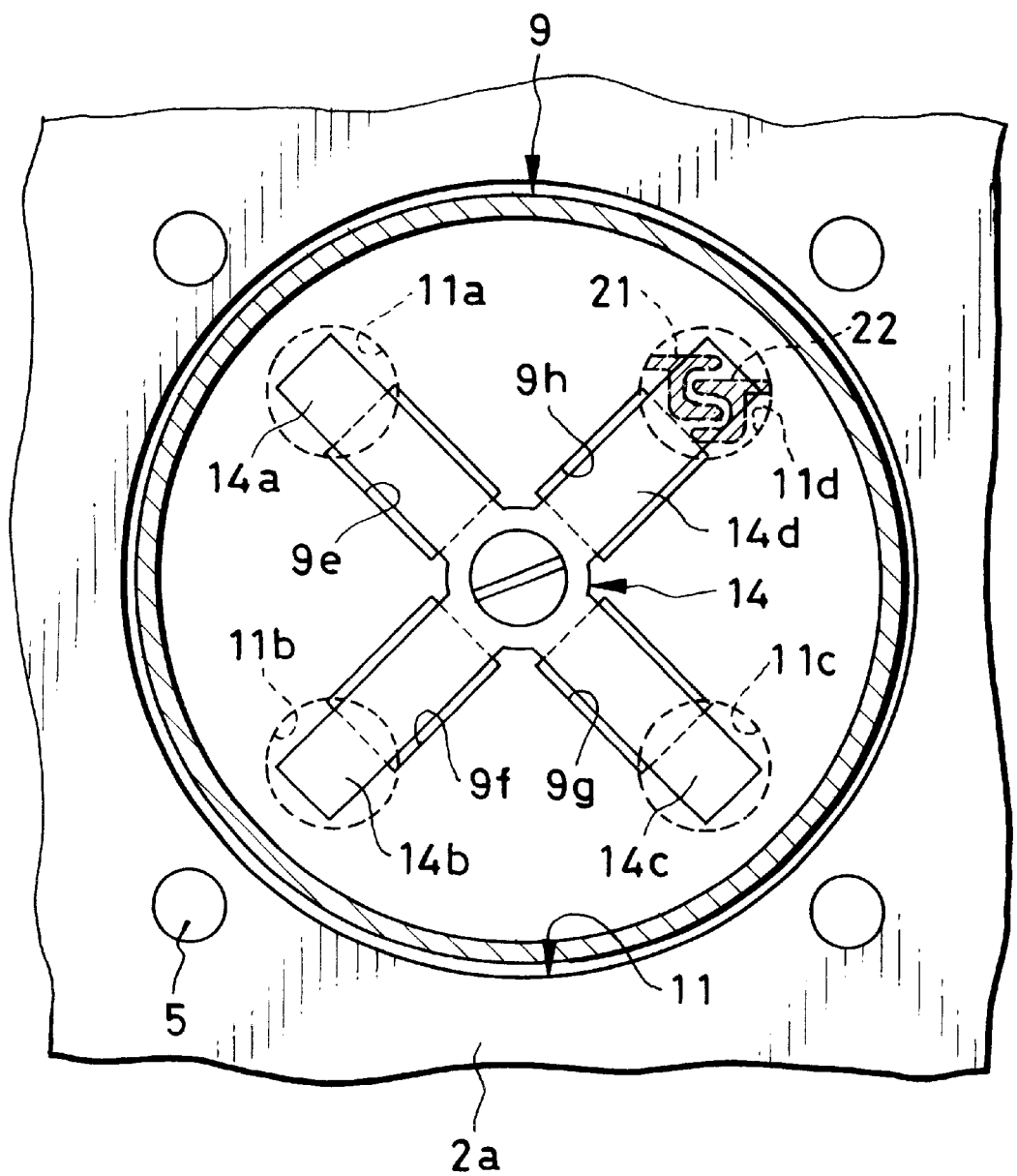
FIG. 3 is an explanatory illustration showing a button body and a leaf spring of the operation button.
Figure 4A:
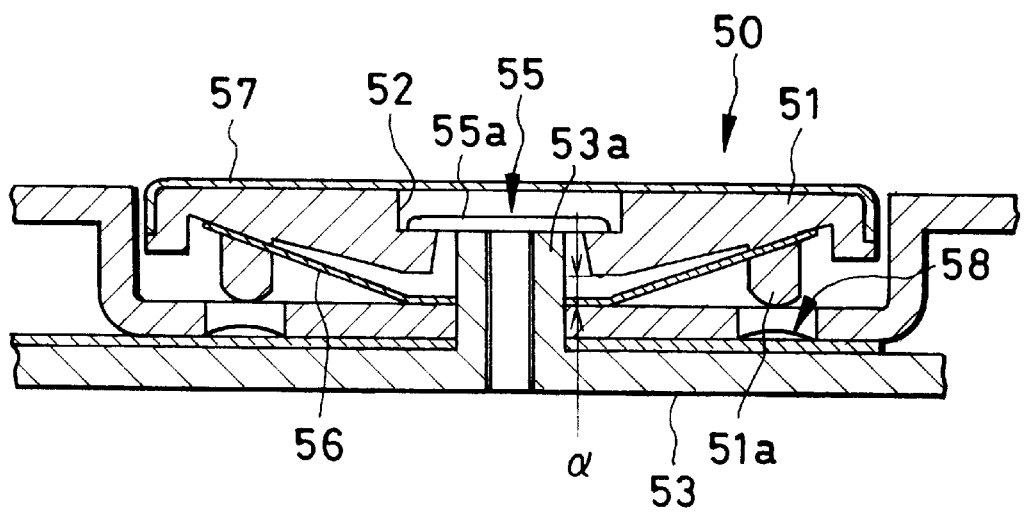
FIGS. 4A and 4B are sectional views showing structure of a conventional operation button.
Figure 4B:
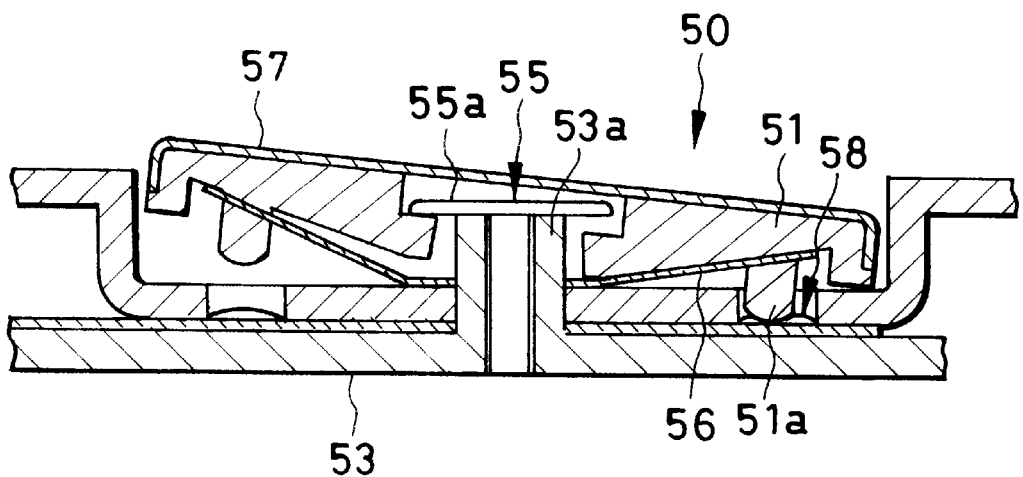

In FIGS. 1A, 1B and 3 showing structure of the operation button 3, a disc-shaped button body 9 is swingably attached to a boss 12 via a through hole 10 formed in the center of the button body 9. The boss 12 is disposed on a central portion of a recess 11 formed in the rear face 2a of the camera body 2. The button body 9 is prevented from tripping by means of a cross-shaped leaf spring 14 which is fixed to the top of the boss 12 by a screw 13. Incidentally, a button cover 15 is integrally attached to an upper portion of the button body 9 so that the leaf spring 14 is veiled between the button body 9 and the button cover 15.

When the leaf spring 14 does not receive any force, in other words, when the leaf spring is kept in an individual state, the leaf spring 14 has a flat shape in that four arm portions 14a–14d of the leaf spring 14 do not curve toward either side. The leaf spring 14 is fixed to the top of the boss 12 by a flange 13a of the screw 13. Upon fixing the leaf spring 14, the arm portions 14a–14d thereof are pushed up so as to be elastically deformed. Hence, the button body 9 is uniformly pressed toward the bottom of the recess 11. In virtue of this, when the operation button 3 does not receive any force, the button body 9 is kept in a neutral position where the button body 9 does not incline in any direction, such as shown in FIG. 1A. It is not necessary to provide a space (gap) between the button body 9 and the bottom of the recess 11. Thus, the operation button 3 may be composed so as to have thin thickness.

The recess 11 is provided with holes 11a–11d which are formed at positions corresponding to the four arm portions 14a–14d of the leaf spring 14. To a rear face of the recess 11, is attached a printed circuit board 18 on which four pairs of contact points 21 and 22 are formed by a printed pattern. The four pairs of the contact points 21 and 22 are bared through the holes 11a–11d of the recess 11 respectively. Incidentally, in order to avoid complication, only one pair of the contact points 21 and 22 is shown in FIG. 3.

Meanwhile, a dome-shaped click member 25 is attached to the printed circuit board 18 so as to cover the contact points 21 and 22. The click member 25 is made of a conductive thin plate and is elastically deformed. The click member 25 and the contact points 21 and 22 constitute a switch. This switch is turned on when the contact points 21 and 22 are short-circuited owing to the elastic deformation of the click member 25.

A face of the button body 9 confronting the bottom of the recess 11 has a conical shape in which its central portion protrudes toward the recess 11. Near the periphery of this face of the button body 9, protrusions 9a–9d are arranged in a circumferential direction at regular intervals. The above-mentioned depressed position of the operation button 3 is an area corresponding to each of the protrusions 9a–9d. Each of the protrusions 9a–9d presses the click member 25 to deform it. Between the center of button body 9 and the protrusions 9a–9d, rectangular openings 9e–9h are formed for receiving curvature of the arm portions 14a–14b which is deformed so as to project. In virtue of these openings 9e–9h, positional relationship between the button body 9 and the leaf spring 14 is maintained in a constant state.

Workings of the operation button having the above structure is described bellow. When any force is not applied to the operation button 3, the button body 9 is uniformly urged toward the recess 11 by means of the arm portions 14a–14d of the leaf spring 14, such as shown in FIG. 1A. At this time, the button body 9 is kept in the neutral position where a circular bottom edge 10a of the through hole 10 wholly abuts on the bottom of the recess 11. Accordingly, the button body 9 does not incline in any direction.

Among the depressed positions of the operation button 3, when the depressed position corresponding to the hole 11a is pressed, for example, the button body 9 is swung in a state that the opening 9e side of the bottom edge 10a of the through hole 10 is a fulcrum. And then, the protrusion 9a presses the click member 25 to elastically deform it. Owing to this, the contact points 21 and 22 of the printed circuit board 18 are short-circuited so that the switch is turned on.

As the depressed position corresponding to the hole 11a is pressed, the arm portion 14c is pushed up by the upper edge of the protrusion 9c of the button body 9. The arm portion 14c is positioned at an opposite side to the arm portion 14a relative to the screw 13. Upon pushing the arm portion 14c upward, this portion 14c is elastically deformed. Hence, the arm portion 14c urges the upper edge of the protrusion 9c toward the recess 11. On the other hand, the arm portion 14a of the leaf spring 14 is pushed by the button cover 15 to be elastically deformed toward the recess 11 after elastic deformation has vanished at once and the force for urging the button body 9 toward the recess 11 has lost. Thus, the arm portion 14a of the leaf spring 14 urges the button cover 15 in a direction separating from the recess 11.

When the operation button 3 is stopped to be depressed, the operation button 3 is speedily returned to the neutral position due to synergism of the arm portions 14a and 14c. Since the synergism of the two arm portions is obtained in this way, it is possible to employ the thin leaf spring which has urging force being relatively weak. Thus, it is possible to further reduce a thickness of the operation button.

In the above embodiment, the operation button is provided with the four depressed positions. However, the present invention is not exclusive to this. The operation button may be provided with the three or five depressed positions, for example. Moreover, in the above embodiment, the operation button is used for the camera. However, the present invention is not exclusive to this. The operation button according to the present invention may be used for not only the camera but also various portable apparatus.

As described above, the operation button according to the present invention comprises the button body swingably attached to an exterior wall of a portable apparatus. The button body has a plurality of the depressed positions arranged in the circumferential direction. The button body is urged by the urging member toward the inside of the portable apparatus so that the return force for returning the button body to the neutral position is applied. It is unnecessary to provide a space between the button body and the exterior wall of the portable apparatus. Thus, the thickness of the operation button may be reduced. Moreover, portions of the urging member, which correspond to the depressed position and the opposite position thereto, apply the return force to the button body. Accordingly, it is possible to employ a thin urging member having relatively weak urging force so that the thickness of the operation button is further reduced.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An operation button used for a portable apparatus, said operation button selectively actuating one of plural switches, said operation button comprising:

a button body swingably attached to an exterior wall of said portable apparatus, said button body having a plurality of depressed positions for swinging said button body, and said switches being disposed so as to correspond to said depressed positions respectively; and an urging member for urging said button body in a direction from the outside of said portable apparatus to the inside thereof, said urging member returning said button body to a neutral position where said button body is kept in a non-swinging state and where said respective switches are prevented from being actuated.

2. An operation button according to claim 1, further comprising:

a cover member attached to said button body and for covering said urging member, said urging member being contained between said button body and said cover member, wherein a part of said urging member corresponding to said depressed position urges said cover member in a direction from the inside of said portable apparatus to the outside thereof when said depressed position is pressed.

3. An operation button according to claim 2, wherein when said depressed position is pressed, a part of said urging member opposite to this depressed position continues to urge said button body in the direction from the outside of said portable apparatus to the inside thereof.

4. An operation button according to claim 3, wherein said button body is contained in a recess formed in said exterior wall of said portable apparatus.

5. An operation button according to claim 4, wherein said button body has protrusions corresponding to said depressed positions and projecting toward said portable apparatus, said protrusion going through a hole formed in the bottom of said recess to actuate said switch.

6. An operation button according to claim 5, wherein said button body has a conical shape, and a central portion of which protrudes so as to abut on the bottom of said recess.

7. An operation button according to claim 6, wherein said central portion is formed with a center hole engaging with a boss projecting on the middle of said recess, and said urging member is fixed to said boss.

8. An operation button according to claim 7, wherein a number of said depressed positions is four, and these depressed positions are arranged in a circumferential direction of said button body.

9. An operation button according to claim 8, wherein said urging member is a leaf spring.

10. An operation button according to claim 9, wherein said leaf spring has a cross shape constituted of four arm portions corresponding to said four depressed positions respectively.

11. An operation button according to claim 10, wherein said button body is provided with an opening for receiving a curvature of said arm portion elastically deformed.

12. An operation button according to claim 1, wherein said portable apparatus is a camera.

13. An operation button according to claim 12, wherein said button body is attached to a rear face of said camera.

* * * * *